United States Patent
Lee et al.

(10) Patent No.: US 10,187,672 B2
(45) Date of Patent: Jan. 22, 2019

(54) METHOD AND SYSTEM FOR SUPPORTING RANDOM ACCESS OF MPEG DATA

(71) Applicant: Electronics and Telecommunications Research Institute, Daejeon (KR)

(72) Inventors: Jin Young Lee, Daejeon (KR); Kug Jin Yun, Daejeon (KR); Won Sik Cheong, Daejeon (KR); Nam Ho Hur, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/861,289

(22) Filed: Jan. 3, 2018

(65) Prior Publication Data

US 2018/0131974 A1 May 10, 2018

Related U.S. Application Data (63) Continuation of application No. 14/414,394, filed as application No. PCT/KR2013/006038 on Jul. 8, 2013, now Pat. No. 9,894,394.

(60) Provisional application No. 61/753,720, filed on Jan. 17, 2013, provisional application No. 61/712,097, filed on Oct. 10, 2012, provisional application No. 61/670,395, filed on Jul. 11, 2012.

(30) Foreign Application Priority Data

Jul. 2, 2013  (KR) ........................ 10-2013-0077254

(51) Int. Cl.
*H04N 7/12* (2006.01)
*H04N 11/04* (2006.01)
*H04N 21/2387* (2011.01)
*H04N 21/236* (2011.01)

(52) U.S. Cl.
CPC ... *H04N 21/2387* (2013.01); *H04N 21/23614* (2013.01)

(58) Field of Classification Search
None
See application file for complete search history.

(56) References Cited

U.S. PATENT DOCUMENTS

| 7,782,947 B2 | 8/2010 | Jeon et al. |
| 2006/0112272 A1 | 5/2006 | Morioka et al. |
| 2008/0040498 A1 | 2/2008 | Setlur et al. |

(Continued)

FOREIGN PATENT DOCUMENTS

| JP | 2003319340 A | 11/2003 |
| KR | 1020060011937 A | 2/2006 |
| KR | 1020060081970 A | 7/2006 |

(Continued)

*Primary Examiner* — Talha M Nawaz
(74) *Attorney, Agent, or Firm* — William Park & Associates Ltd.

(57) ABSTRACT

Provided is a method of supporting a random access of MPEG data, the method including: obtaining at least one access unit including media data coded through processing including an encapsulation and a packetization; generating at least one media processing unit (MPU) by grouping at least one access unit; determining an initialization flag indicating whether the at least one access unit includes all of data required for initialization of a decoding process, in the at least one MPU; and inserting the initialization flag into a header of the at least one MPU.

10 Claims, 8 Drawing Sheets timed media data processing 110 non-timed media data processing 120

(56) References Cited

U.S. PATENT DOCUMENTS

2010/0223533 A1* 9/2010 Stockhammer ..... H03M 13/373
714/776
2012/0230433 A1 9/2012 Chen et al.

FOREIGN PATENT DOCUMENTS

KR 1020070040103 A 4/2007
KR 1020080114500 A 12/2008

* cited by examiner

FIG. 1A timed media data processing 110

FIG. 1B non-timed media data processing 120

| Syntax | No. Of bits | Mnemonic |
|---|---|---|
| MPU_Header(){<br>  mpu_length;<br>  header_length;<br>  mpu_sequence_number;<br>  number_of_au;<br>  for(int i=0; i<number_of_au; i++){<br>    au_length;<br>    initialization_flag; ~410<br>    potential_RAP_flag; ~420<br>    if ( potential_RAP_flag )<br>      initialization_au; ~430<br>  }<br>  private_header_flag;<br>  if(private_header_flag == 1){<br>    private_header_length<br>    private_header<br>  }<br>}<br>MPU_Payload() | <br><br><br><br><br><br><br>1<br>1<br><br>TBD | |

| Syntax | No. Of bits | Mnemonic |
|---|---|---|
| MPU_Header(){<br>    mfu_length;<br>    header_length;<br>    start_end_indicator;<br>    initialization_data_flag; ~610<br>    if (start_end_indicator != 3) {<br>        priority; ~620<br>        dependency_counter;<br>        decoding_order;<br>    }<br>}<br>MFU_Payload() | 1 | |

METHOD AND SYSTEM FOR SUPPORTING RANDOM ACCESS OF MPEG DATA

CROSS-REFERENCE TO RELATED APPLICATIONS

The present application is a Continuation of U.S. application Ser. No. 14/414,394, filed on Jan. 12, 2015, which is a national stage of PCT/KR2013/006038 filed on Jul. 8, 2013, which claims priority to Korean application number 10-2013-0077254, filed on Jul. 2, 2013, in the Korean Intellectual Property Office. PCT/KR2013/006038 claims priority to U.S. provisional patent applications: 61/670,395 filed on Jul. 11, 2012, 61/712,097 filed on Oct. 10, 2012, and 61/753,720 filed on Jan. 17, 2013 with the United States Patent and Trademark Office.

TECHNICAL FIELD

The present invention relates to a system and method for supporting a random access of MPEG data, and more particularly, to a technology of supporting a random access by including, in MPEG data, data used for initialization of a decoding process or by including all of data required for initialization of the decoding process.

BACKGROUND ART

A technology of supporting a random access of MPEG data may support a random access by inserting, into a bitstream of MPEG data, an I frame in which an image frame is independently coded and supports a random access. Here, the random access may be performed only at a location of the I frame.

DISCLOSURE OF INVENTION

Technical Goals

Embodiments of the present invention provide a method, apparatus, and system for supporting a random access by setting an enhanced media processing unit (MPU) and media fragment unit (MFU), in a transmission apparatus.

Embodiments of the present invention also provide a method, apparatus, and system for setting an enhanced MPU and MFU by inserting a predetermined flag into a header of an MPU and an MFU during a process of supporting a random access.

Embodiments of the present invention also provide a method, apparatus, and system for performing a random access using an enhanced MPU and MFU, in a reception apparatus.

Embodiments of the present invention also provide a method, apparatus, and system for activating a random access by extracting a predetermined flag included in a header of an MPU and an MFU during a process of performing the random access.

Technical Solutions

According to an aspect of the present invention, there is provided a method of supporting a random access of MPEG data, the method including: obtaining at least one access unit including media data coded through processing including an encapsulation and a packetization; generating at least one media processing unit (MPU) by grouping the at least one access unit; determining an initialization flag indicating whether the at least one access unit includes all of data required for initialization of a decoding process, in the at least one MPU; and inserting the initialization flag into a header of the at least one MPU.

The determining may include setting the initialization flag to "1" when the at least one access unit includes all of the data required for the initialization of the decoding process.

The method of supporting a random access of MPEG data may further include: determining a potential random access point flag indicating whether the at least one access unit is capable of being a random access point, in the at least one MPU; and inserting the potential random access point flag into the header of the at least one MPU.

The determining of the potential random access point flag may include setting the potential random access point flag to "1" when the at least one access unit is the random access point.

The method of supporting a random access of MPEG data may further include: determining an initialization access unit indicating an order/index of the at least one access unit including all of initialization data required for the decoding process available with respect to a random access point, in the at least one MPU; and inserting the initialization access unit into the header of the at least one MPU.

According to another aspect of the present invention, there is provided a method of performing a random access of MPEG data, the method including: receiving at least one MPU; extracting an initialization flag included in a header of the at least one MPU; determining whether the at least one access unit included in the at least one MPU includes all of data required for initialization of a decoding process, based on the initialization flag; and activating a random access to the at least one access unit included in the at least one MPU, based on the determination result.

According to still another aspect of the present invention, there is provided a method of supporting a random access of MPEG data, the method including: obtaining at least one access unit including media data coded through processing including an encapsulation and a packetization; generating at least one media fragment unit (MFU) by fragmenting the at least one access unit; determining an initialization data flag indicating whether the at least one MFU includes all of data required for initialization of a decoding process, in the at least one MFU; and inserting the initialization data flag into a header of the at least one MFU.

The determining may include setting the initialization data flat to "1" when the at least one MFU includes data used for the initialization of the decoding process.

The method of supporting a random access of MPEG data may further include: determining a priority indicating a relative priority of the at least one MFU with respect to remaining MFUs excluding the at least one MFU, in the at least one MFU; and inserting the priority into the header of the at least one MFU.

When the initialization flag data is set to "1", the priority may indicate a level of initialization data of the at least one MFU.

According to yet another aspect of the present invention, there is provided a method of performing a random access of MPEG data, the method including: receiving at least one MFU; extracting an initialization data flag included in a header of the at least one MFU; determining whether the at least one MFU includes data used for initialization of a decoding process, based on the initialization data flag; and activating a random access to the at least one MFU based on the determination result.

Effects of Invention

According to embodiments of the present invention, there may be provided a method, apparatus, and system for supporting a random access by setting an enhanced media processing unit (MPU) and media fragment unit (MFU), in a transmission apparatus.

Also, according to embodiments of the present invention, there may be provided a method, apparatus, and system for setting an enhanced MPU and MFU by inserting a predetermined flag into a header of an MPU and an MFU during a process of supporting a random access.

Also, according to embodiments of the present invention, there may be provided a method, apparatus, and system for performing a random access using an enhanced MPU and MFU in a reception apparatus.

Also, according to embodiments of the present invention, there may be provided a method, apparatus, and system for activating a random access by extracting a predetermined flag included in a header of an MPU and an MFU during a process of performing the random access.

BEST MODE FOR CARRYING OUT THE INVENTION

Hereinafter, embodiments of the present invention will be described with reference to the accompanying drawings. However, the present invention is not limited to the embodiments or restricted thereby. Also, like reference numerals used in each drawing refer to like constituent elements.

Figure 1A:
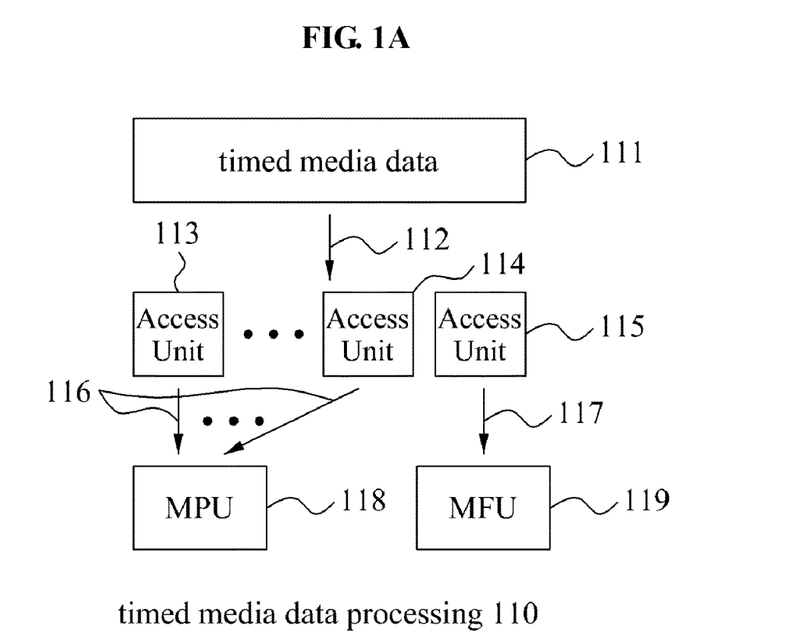
FIGS. 1A and 1B are diagrams illustrating a media processing unit (MPU) and a media fragment unit (MFU).
Figure 1B:
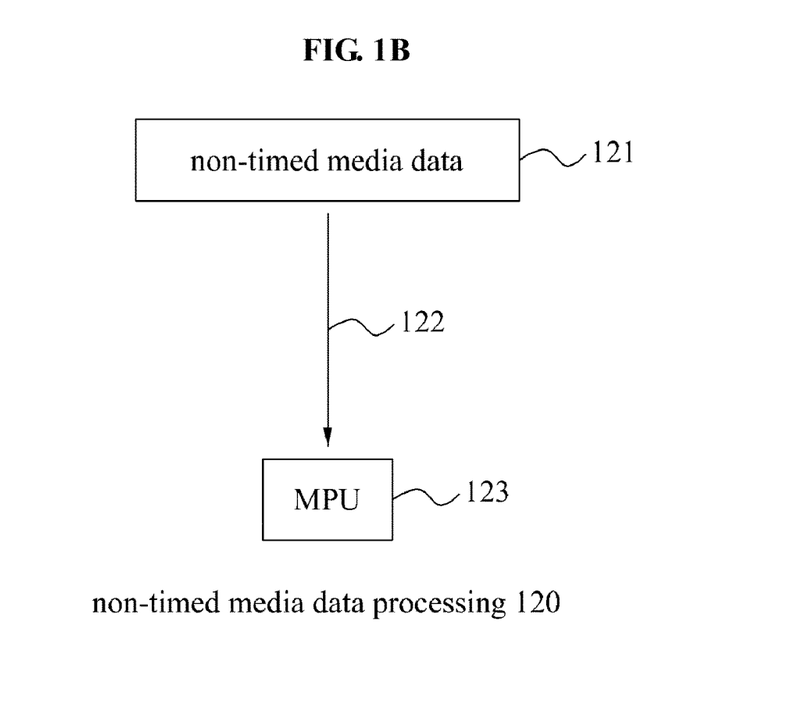

FIGS. 1A and 1B are diagrams illustrating a media processing unit (MPU) and a media fragment unit (MFU).

Referring to FIGS. 1A and 1B, timed media data 111 and non-timed media data 121 may be set using the MPU and the MFU that are formats of an MPEG media transport (MMT) asset and thereby be processed in operations 110 and 120.

Here, each of MPUs 118 and 123 may be construed from at least one access unit, at least one MFU 119, or the non-timed media data 121, and may be provided in an encapsulated and packetized data format.

Also, the MFU 119 may be generated by fragmenting an access unit or may be generated from a single access unit, and may be provided in an encapsulated and packetized data format.

More specifically, referring to operation 110 of processing the timed media data 111, the timed media data 111 may be converted to a plurality of access units 113, 114, and 115 coded through encapsulation processing in operation 112. Also, the plurality of access units 113, 114, and 115 may be converted to the MPU 118 and the MFU 119 that are formats of the MMT asset in operations 116 and 117. Here, the MPU 118 may be generated by grouping the plurality of access units 113 and 114 in operation 116. The MFU 119 may be generated from the single access unit 115 in operation 117. The MFU 119 may be generated by fragmenting the single access unit 115. A description related thereto will be made below.

Referring to operation 120 of processing the non-timed media data 121, the non-timed media data 121 may be converted to the MPU 123 in operation 122.

Figure 2:
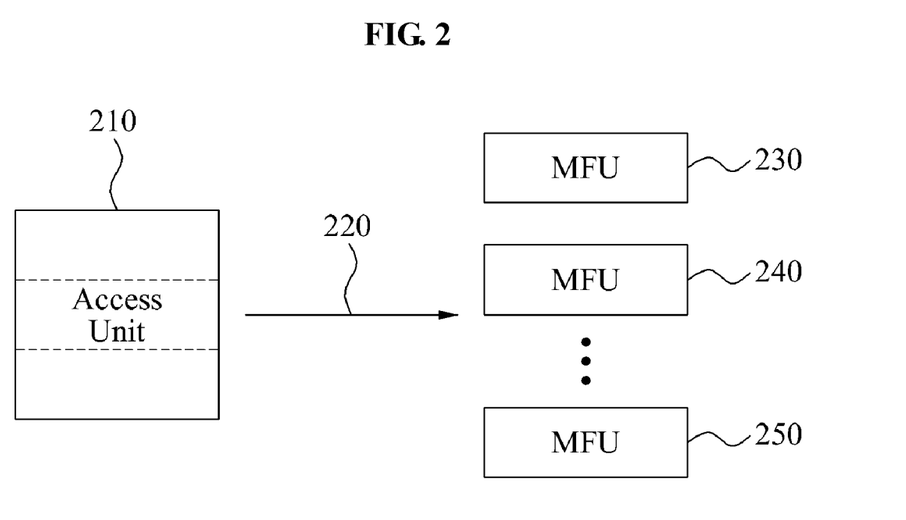
FIG. 2 is a diagram illustrating an MFU obtained by fragmenting an access unit.

FIG. 2 is a diagram illustrating an MFU obtained by fragmenting an access unit.

Referring to FIG. 2, a plurality of MFUs 230, 240, and 250 may be obtained by fragmenting a single access unit 210 in operation 220. Here, each of the plurality of MFUs 230, 240, and 250 may be independently used, may include an identifier to be distinguished from each other, and may include an identifier for generalizing relational information between the plurality of MFUs 230, 240, and 250 within a single access unit.

The aforementioned MPU and MFU may be defined by reference materials of "High efficiency coding and media delivery in heterogeneous environments" specified in International Organization for Standardization/International Electrotechnical Commission (ISO/IEC) Joint Technical Committee One (JTC1)/SC29/WG11 n12690.

Figure 3:
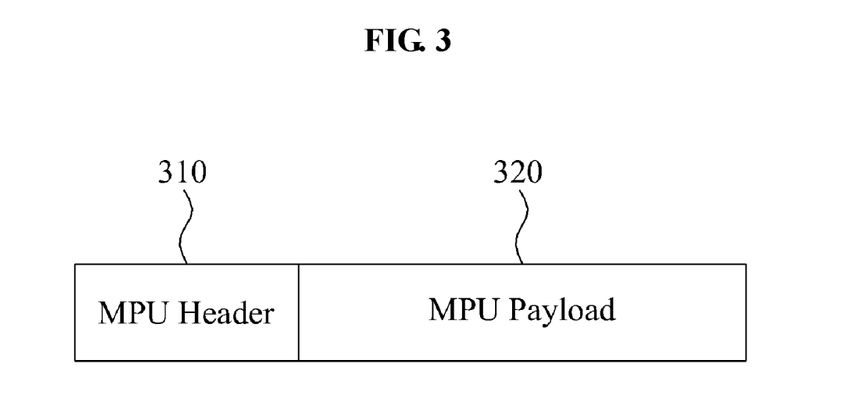
FIG. 3 is a diagram illustrating an MPU packet according to an embodiment of the present invention.

FIG. 3 is a diagram illustrating an MPU packet according to an embodiment of the present invention.

Referring to FIG. 3, the MPU packet includes an MPU header 310 and an MPU payload 320. Here, the MPU payload 320 may include MPEG data. The MPU header 310 may include an MPU length, an MPU header length, an MPU sequence number, an access unit number, an access unit length, an initialization flag, a potential random access point (RAP) flag, an initialization access unit, a private header flag, a private header length, and a private header. A description related thereto will be made below.

Figure 4:
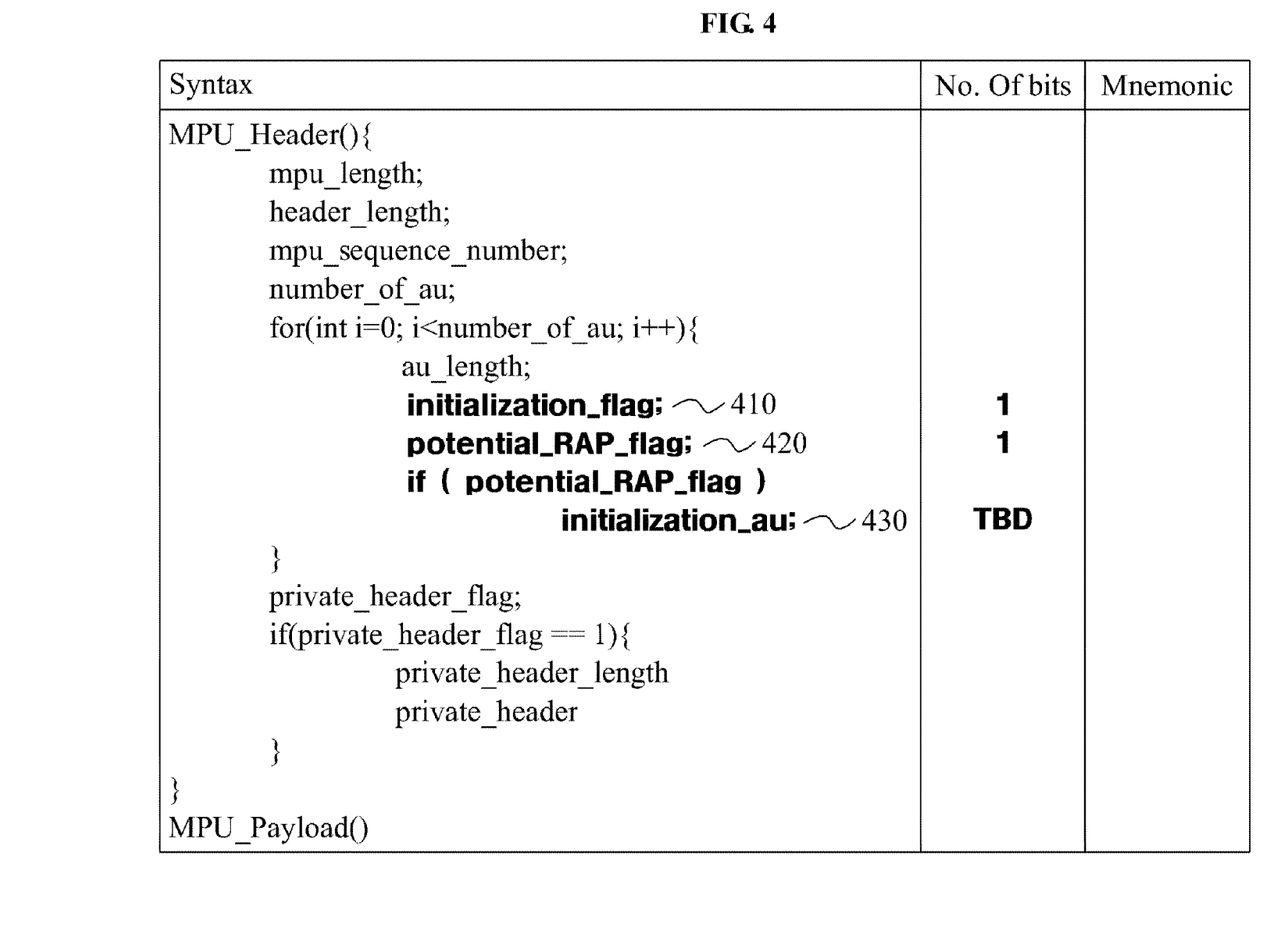
FIG. 4 is a diagram illustrating syntax of an MPU according to an embodiment of the present invention.

FIG. 4 is a diagram illustrating syntax of an MPU according to an embodiment of the present invention.

Referring to FIG. 4, a header of the MPU may include an MPU length, an MPU header length, an MPU sequence number, an access unit number, an access unit length, a private header flag, a private header length, a private header, an initialization flag 410, a potential RAP flag 420, and an initialization access unit 430.

Here, the initialization flag 410 may indicate whether an access unit includes all of data required for initialization of a decoding process, in the MPU. The initialization flag 410 may be set to a bit value of "1" when the access unit includes all of the data required for the initialization of the decoding process.

Also, the potential RAP flag 420 may indicate whether the access unit is capable of being a random access point, in the MPU. Here, the potential RAP flag 420 may be set to a bit value of "1" when the access unit is the random access point.

Also, the initialization access unit 430 may indicate an order/index of the access unit including all of initialization data required for the decoding process available with respect to the random access point, in the MPU. Here, the initialization access point 430 may be set when the potential RAP flag 420 is valid.

Figure 5:
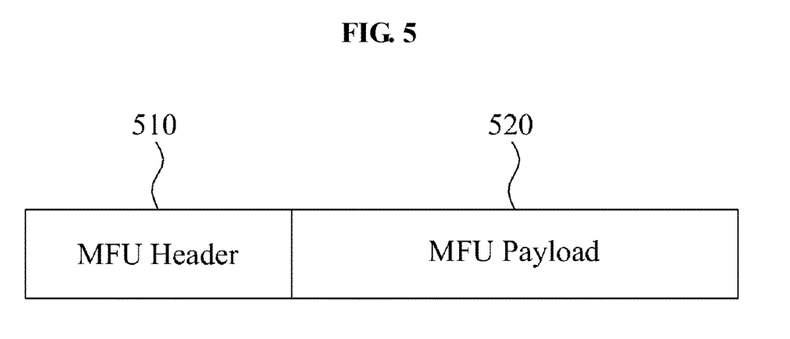
FIG. 5 is a diagram illustrating an MFU packet according to an embodiment of the present invention.

FIG. 5 is a diagram illustrating an MFU packet according to an embodiment of the present invention.

Referring to FIG. 5, the MFU packet includes an MFU header 510 and an MFU payload 520. Here, the MFU payload 520 may include MPEG data. The MFU header 510 may include an MFU length, an MFU header length, a start end indicator, an initialization data flag, a priority, a dependency counter, and a decoding order. A description related thereto will be made below.

Figure 6:
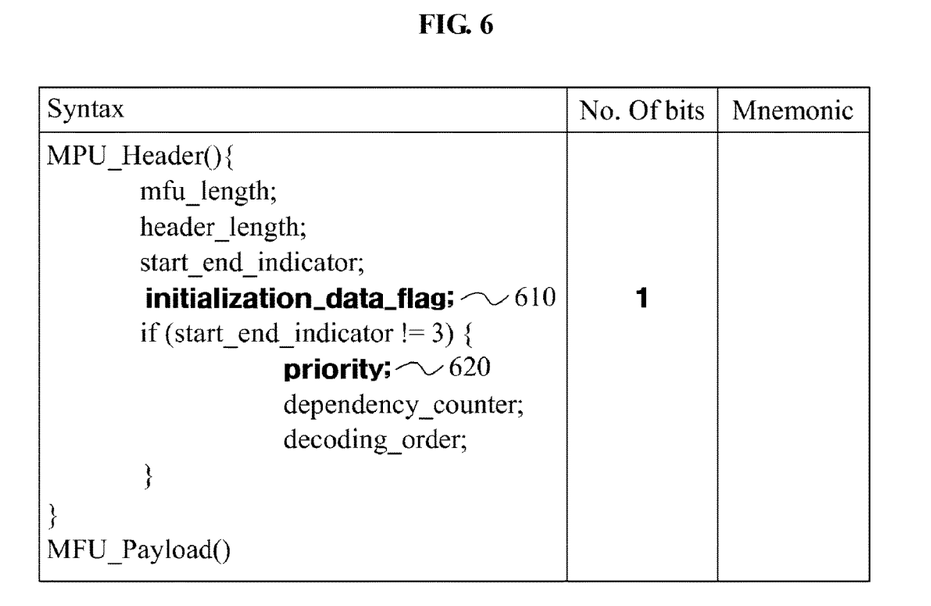
FIG. 6 is a diagram illustrating syntax of an MFU according to an embodiment of the present invention.

FIG. 6 is a diagram illustrating syntax of an MFU according to an embodiment of the present invention.

Referring to FIG. 6, a header of MFU may include an MFU length, an MFU header length, a start end indicator, an initialization data flag 610, a priority 620, a dependency counter, and a decoding order.

Here, the initialization data flag 610 may indicate whether the MFU includes data used for initialization of a decoding process, in the MFU. The initialization data flag 610 may be set to a bit value of "1" when the MFU includes data used for the initialization of the decoding process.

Also, the priority 620 may indicate a relative priority of a corresponding MFU with respect to remaining MFUs excluding the corresponding MFU, in the MFU. Here, when the initialization data flag 610 is set to a bit value of "1", the priority 620 may indicate a level of initialization data of the corresponding MFU. Also, the priority 620 may be set when a start end indicator is identical to a predetermined parameter.

Figure 7:
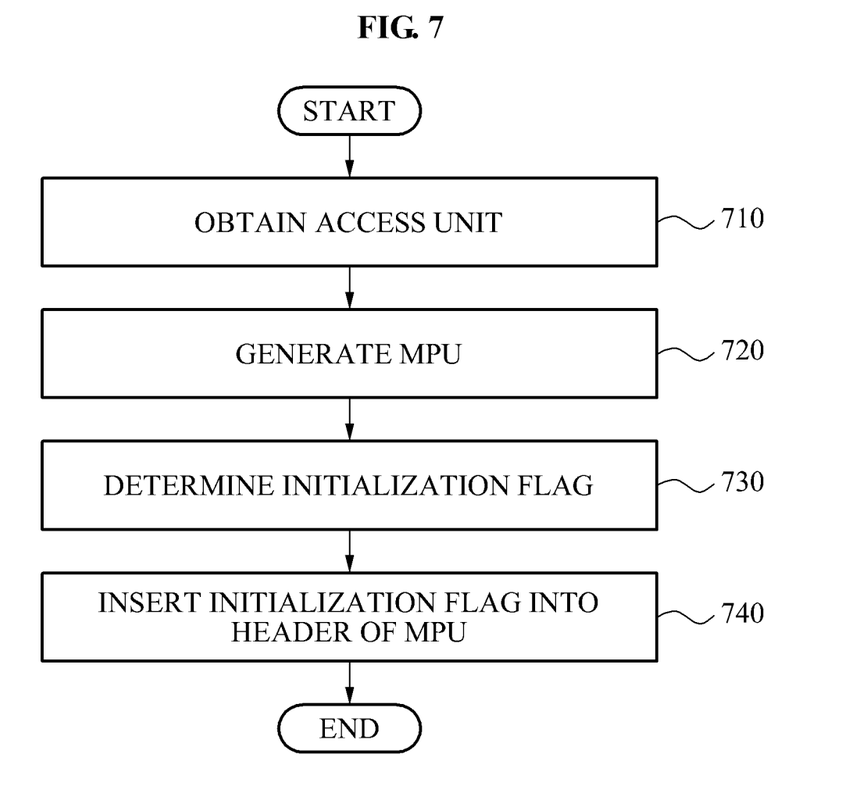
FIG. 7 is a flowchart illustrating a method of supporting a random access of MPEG data set as an MPU in a transmission apparatus according to an embodiment of the present invention.

FIG. 7 is a flowchart illustrating a method of supporting a random access of MPEG data set as an MPU in a transmission apparatus according to an embodiment of the present invention.

Referring to FIG. 7, the method according to an embodiment of the present invention may obtain at least one access unit including media data coded through processing including an encapsulation and a packetization in operation 710.

In operation 720, the method may generate at least one MPU by grouping the at least one access unit.

In operation 730, the method may determine an initialization flag indicating whether the at least one access unit includes all of data required for initialization of a decoding process, in the at least one MPU. Here, a process of determining the initialization flag may include a process of setting the initialization flag to "1" when at least one access unit includes all of data required for the initialization of the decoding process.

In operation 740, the method may insert the initialization flag into a header of the at least one MPU.

Also, the method according to an embodiment of the present invention may determine a potential RAP flag indicating whether the at least one access unit is capable of being a random access point, in the at least one MPU, and may insert the potential RAP flag into the header of the at least one MPU. Here, a process of determining the potential RAP flag may include a process of setting the potential RAP flag "1" when the at least one access unit is the random access point.

Also, the method according to an embodiment of the present invention may determine an initialization access unit indicating an order/index of the at least one access unit including all of initialization data required for the decoding process available with respect to a random access point, in the at least one MPU, and may insert the initialization access unit into the header of the at least one MPU.

Figure 8:
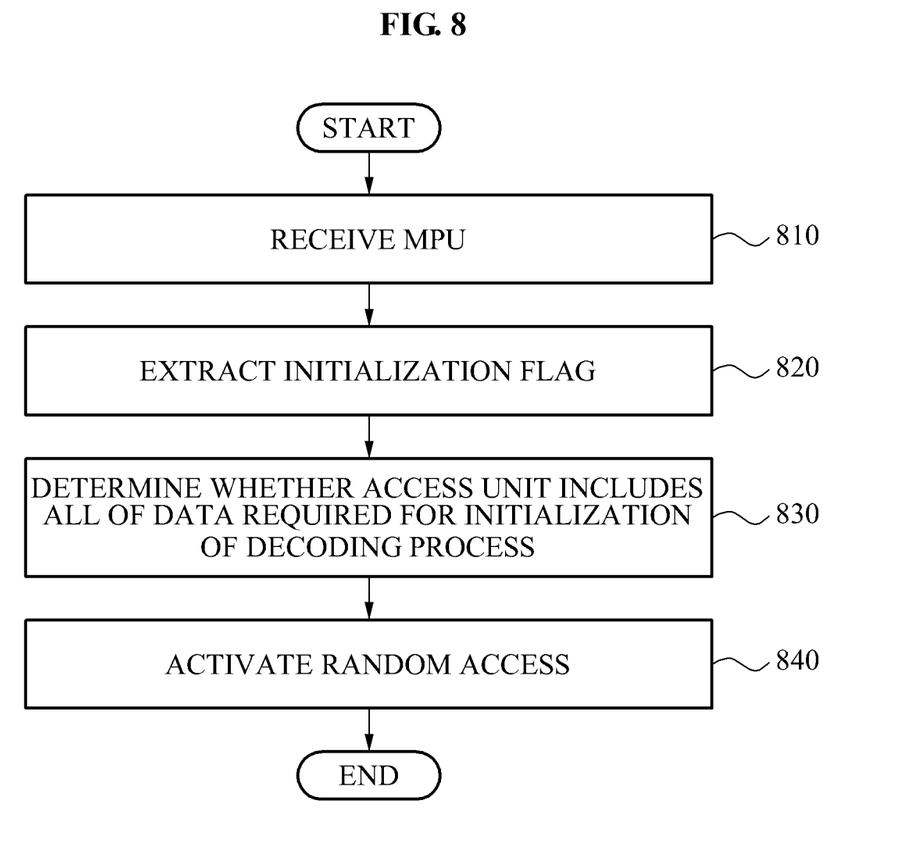
FIG. 8 is a flowchart illustrating a method of performing a random access of MPEG data set as an MPU in a reception apparatus according to an embodiment of the present invention.

FIG. 8 is a flowchart illustrating a method of performing a random access of MPEG data set as an MPU in a reception apparatus according to an embodiment of the present invention.

Referring to FIG. 8, the method according to an embodiment of the present invention may receive at least one MPU in operation 810.

In operation 820, the method may extract an initialization flag included in a header of the at least one MPU.

In operation 830, the method may determine whether the at least one access unit included in the at least one MPU includes all of data required for initialization of a decoding process, based on the initialization flag.

In operation 840, the method may activate a random access to the at least one access unit included in the at least one MPU, based on the determination result.

Figure 9:
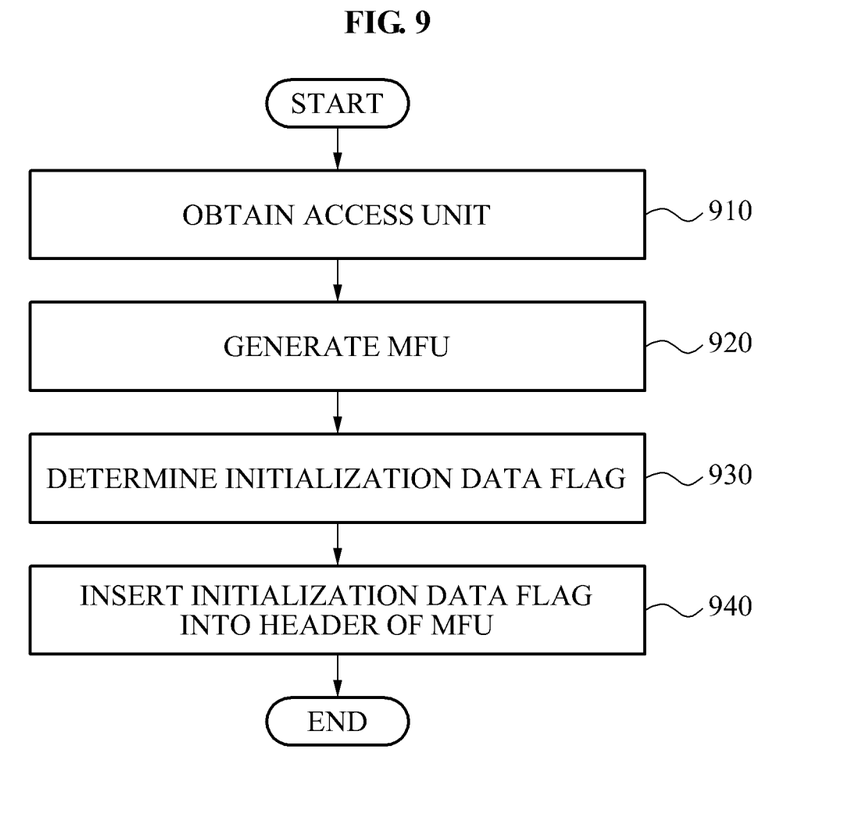
FIG. 9 is a flowchart illustrating a method of supporting a random access of MPEG data set as an MFU in a transmission apparatus according to an embodiment of the present invention.

FIG. 9 is a flowchart illustrating a method of supporting a random access of MPEG data set as an MFU in a transmission apparatus according to an embodiment of the present invention.

Referring to FIG. 9, the method according to an embodiment of the present invention may obtain at least one access unit including media data coded through processing including an encapsulation and a packetization in operation 910.

In operation 920, the method may generate at least one MFU by fragmenting the at least one access unit.

In operation 930, the method may determine an initialization data flag indicating whether the at least one MFU includes all of data required for initialization of a decoding process, in the at least one MPU. Here, a process of determining the initialization data flag may include a process of setting the initialization data flat to "1" when the at least one MFU includes data used for initialization of the decoding process.

In operation 940, the method may insert the initialization data flag into a header of the at least one MFU.

Also, the method according to an embodiment of the present invention may determine a priority indicating a relative priority of the at least one MFU with respect to remaining MFUs excluding the at least one MFU, in the at least one MFU, and may insert the priority into the header of the at least one MFU. When the initialization flag data is set to "1", the priority may indicate a level of initialization data of the at least one MFU.

Figure 10:
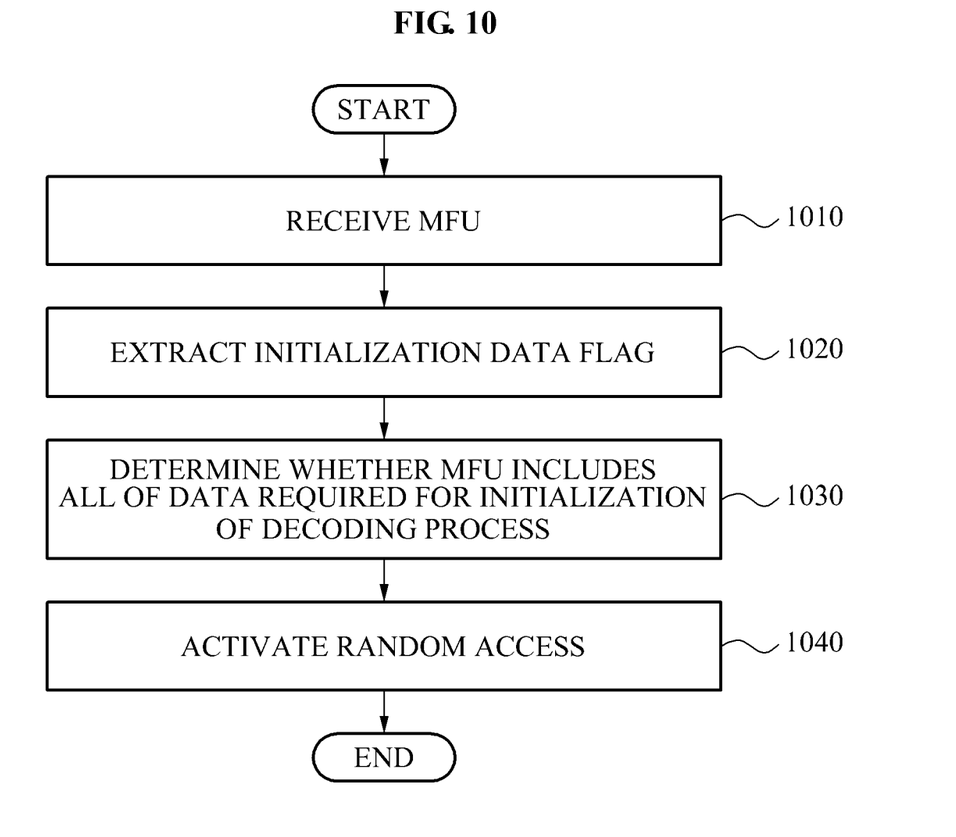
FIG. 10 is a flowchart illustrating a method of supporting a random access of MPEG data set as an MFU in a reception apparatus according to an embodiment of the present invention.

FIG. 10 is a flowchart illustrating a method of supporting a random access of MPEG data set as an MFU in a reception apparatus according to an embodiment of the present invention.

Referring to FIG. 10, the method according to an embodiment of the present invention may receive at least one MFU in operation 1010.

In operation 1020, the method may extract an initialization data flag included in a header of the at least one MFU.

In operation 1030, the method may determine whether the at least one MFU includes data used for initialization of a decoding process, based on the initialization data flag.

In operation 1040, the method may activate a random access to the at least one MFU based on the determination result.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of processing MPEG data performed by one or more processor, the method comprising:
   identifying timed media data and non-time media data;
   generating at least one media processing unit (MPU) related to media transport asset based on the timed media data and non-time media data;
   providing the MPU as encapsulated and packetized data format,
   wherein the each MPU includes a plurality of Access Unit (AU) derived from the timed media data or non-timed media data,
   wherein a packet header for MPU includes random access point (RAP) flag, and an MPU sequence number.

2. The method of claim 1, further comprising:
   determining an initialization flag indicating whether the at least one access unit comprises all of data required for initialization of a decoding process, in the at least one MPU; and
   inserting the initialization flag into a header of the at least one MPU,
   wherein the determining comprises setting the initialization flag to "1" when the at least one access unit comprises all of the data required for the initialization of the decoding process.

3. The method of claim 1, further comprising:
   determining a potential random access point flag indicating whether the at least one access unit is capable of being a random access point, in the at least one MPU; and
   inserting the potential random access point flag into the header of the at least one MPU.

4. The method of claim 3, wherein the determining of the potential random access point flag comprises setting the potential random access point flag to "1" when the at least one access unit is the random access point.

5. The method of claim 1, further comprising:
   determining an initialization access unit indicating an order/index of the at least one access unit comprising all of initialization data required for the decoding process available with respect to a random access point, in the at least one MPU; and
   inserting the initialization access unit into the header of the at least one MPU.

6. An apparatus for processing MPEG data, the apparatus comprising:
   one or more processors are configured to:
   identify timed media data and non-time media data;
   generate at least one media processing unit (MPU) related to media transport asset based on the timed media data and non-time media data;
   provide the MPU as encapsulated and packetized data format,
   wherein the each MPU includes a plurality of Access Unit (AU) derived from the timed media data or non-timed media data,
   wherein a packet header for MPU includes random access point (RAP) flag, and an MPU sequence number.

7. The apparatus of claim 6, wherein the processor is configured to determine an initialization flag indicating whether the at least one access unit comprises all of data required for initialization of a decoding process, in the at least one MPU, insert the initialization flag into a header of the at least one MPU and set the initialization flag to "1" when the at least one access unit comprises all of the data required for the initialization of the decoding process.

8. The apparatus of claim 6, wherein the processor is configured to:
   determine a potential random access point flag indicating whether the at least one access unit is capable of being a random access point, in the at least one MPU; and insert the potential random access point flag into the header of the at least one MPU.

9. The apparatus of claim 8, wherein the processor is configured to determine of the potential random access point flag comprises setting the potential random access point flag to "1" when the at least one access unit is the random access point.

10. The apparatus of claim 6, wherein the processor is configured to determine an initialization access unit indicating an order/index of the at least one access unit comprising all of initialization data required for the decoding process available with respect to a random access point, in the at least one MPU; and insert the initialization access unit into the header of the at least one MPU.

\* \* \* \* \*